(12) United States Patent
Park et al.

(10) Patent No.: US 11,617,987 B2
(45) Date of Patent: Apr. 4, 2023

(54) REVERSE OSMOSIS APPARATUS AND SEAWATER DESALINATION SYSTEM HAVING THE SAME

(71) Applicant: DOOSAN ENERBILITY CO., LTD, Changwon-si (KR)

(72) Inventors: Yong Hae Park, Busan (KR); Wee Kwan Kang, Yongin (KR); Hye Ryun Ahn, Suwon (KR); Young Geun Lee, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 87 days.

(21) Appl. No.: 17/334,856

(22) Filed: May 31, 2021

(65) Prior Publication Data
US 2021/0379532 A1    Dec. 9, 2021

(30) Foreign Application Priority Data
Jun. 3, 2020    (KR) .................. 10-2020-0067090

(51) Int. Cl.
*B01D 61/08*    (2006.01)
*B01D 61/02*    (2006.01)
(Continued)

(52) U.S. Cl.
CPC .......... *B01D 61/08* (2013.01); *B01D 61/025* (2013.01); *B01D 61/10* (2013.01); *C02F 1/441* (2013.01);
(Continued)

(58) Field of Classification Search
CPC ...... B01D 61/08; B01D 61/025; B01D 61/10; B01D 2313/04; B01D 2313/10;
(Continued)

(56) References Cited

U.S. PATENT DOCUMENTS

| | | | | |
|---|---|---|---|---|
| 4,517,085 A | * | 5/1985 | Driscoll ................. | B01D 29/54 210/321.83 |
| 2006/0180540 A1 | * | 8/2006 | Colby .................... | B01D 63/10 210/321.74 |

(Continued)

FOREIGN PATENT DOCUMENTS

| | | |
|---|---|---|
| JP | 09024255 A | 1/1997 |
| KR | 20140056812 A | 5/2014 |

(Continued)

OTHER PUBLICATIONS

English language machine translation of KR20140056812, 4 pages, No Date.*

(Continued)

*Primary Examiner* — Pranav N Patel
(74) *Attorney, Agent, or Firm* — Harvest IP Law LLP

(57) ABSTRACT

A reverse osmosis apparatus for a seawater desalination system is provided. The reverse osmosis apparatus includes a barrel in which a plurality of vessels receiving reverse osmosis membrane units are arranged, a feed tank provided in an intermediate portion of the barrel and connected to a seawater inlet, a first water tank provided inside a first end portion of the barrel and connected to a plurality of first vessels connected to a first side of the feed tank, and a second water tank provided inside a second end portion of the barrel and connected to a plurality of second vessels connected to a second side of the feed tank.

18 Claims, 6 Drawing Sheets

(51) Int. Cl.
  *B01D 61/10* (2006.01)
  *C02F 1/44* (2023.01)
  *C02F 103/08* (2006.01)

(52) U.S. Cl.
  CPC ...... *B01D 2313/04* (2013.01); *B01D 2313/10* (2013.01); *B01D 2313/13* (2013.01); *B01D 2313/143* (2013.01); *B01D 2313/20* (2013.01); *B01D 2313/21* (2013.01); *B01D 2319/02* (2013.01); *B01D 2319/04* (2013.01); *C02F 2103/08* (2013.01)

(58) Field of Classification Search
  CPC .......... B01D 2313/13; B01D 2313/143; B01D 2313/20; B01D 2313/21; B01D 2319/02; B01D 2319/04; B01D 2313/08; B01D 2313/19; B01D 2319/022; B01D 61/06; B01D 61/026; B01D 2319/025; C02F 1/441; C02F 2103/08; C02F 1/001; C02F 2201/004; Y02A 20/131
  See application file for complete search history.

(56) References Cited

U.S. PATENT DOCUMENTS

2016/0207005 A1\* 7/2016 Berrada ................. B01D 69/04
2017/0209834 A1\* 7/2017 Cohen ..................... C02F 1/008
2019/0247795 A1\* 8/2019 Yoshimura ........... B01D 63/106

FOREIGN PATENT DOCUMENTS

| KR | 1020140056812 A | 5/2014 |
| KR | 1020170140920 A | 12/2017 |
| KR | 102037007 B1 | 10/2019 |

OTHER PUBLICATIONS

KR OA, dated Mar. 3, 2022.
KR OA dated Aug. 11, 2021.

\* cited by examiner

REVERSE OSMOSIS APPARATUS AND SEAWATER DESALINATION SYSTEM HAVING THE SAME

CROSS REFERENCE TO RELATED APPLICATION

This application claims priority to Korean Patent Application No. 10-2020-0067090, filed on Jun. 3, 2020, the disclosure of which is incorporated herein by reference in its entirety.

FIELD

Apparatuses and methods consistent with exemplary embodiments relate to a reverse osmosis apparatus and a seawater desalination system having the same.

BACKGROUND

In general, a processing system for desalinating seawater is configured to primarily remove impurities by pumping seawater stored in a storage tank with a predetermined volume through a transport pump to sand or multi-layered filter in a pretreatment step. And if necessary, the seawater desalination system is configured to remove organic impurities by passing the seawater through an activated carbon filter, and finally remove fine impurities by passing the seawater through a cartridge filter, a back filter, or the like.

Pretreated water subjected to such pretreated process is introduced into a reverse osmosis filter for desalination and separated into desalinated permeated water and concentrated water, and the concentrated water is discharged, and the desalinated permeated water is mineralized and sterilized in a post-treatment step and flows into a final treatment storage tank.

A related art reverse osmosis filter is configured such that a plurality of reverse osmosis membrane units are arranged by being inserted into a vessel. In detail, when seawater introduced into a first side of each of the reverse osmosis membrane units is moved toward a second side of the reverse osmosis membrane unit, the seawater passes through a reverse osmosis membrane by reverse osmosis and is collected to a tube arranged at a center of the reverse osmosis membrane unit, thereby being discharged through the second side of the reverse osmosis membrane unit.

However, the related art reverse osmosis filter, especially a reverse osmosis filter with a large treatment capacity, has problems such as a non-compact design, high energy consumption rate, large maintenance costs, and difficulty in operation and maintenance.

Furthermore, when the reverse osmosis membrane units are inserted into the vessel, an O-ring provided at an outer circumferential surface of the vessel is twisted so that seawater leaks into the vessel and tube pressure is lost.

SUMMARY

Aspects of one or more exemplary embodiments provide a reverse osmosis apparatus and a seawater desalination system having the same. In particular, the reverse osmosis apparatus is configured such that seawater is fed to a feed tank arranged at an intermediate portion of a barrel at high pressure, a plurality of vessels are arranged at both sides of the feed tank, and water tanks are arranged at both ends of the barrel, so that the compact design is realized when designing a high capacity reverse osmosis apparatus, energy consumption is reduced, maintenance costs are reduced by easily replacing reverse osmosis membrane units or vessels.

According to an aspect of an exemplary embodiment, there is provided a reverse osmosis apparatus for a seawater desalination system, the reverse osmosis apparatus including: a barrel in which a plurality of vessels receiving reverse osmosis membrane units may be arranged; a feed tank provided in an intermediate portion of the barrel and connected to a seawater inlet; a first water tank provided inside a first end portion of the barrel and connected to a plurality of first vessels connected to a first side of the feed tank; and a second water tank provided inside a second end portion of the barrel and connected to a plurality of second vessels connected to a second side of the feed tank.

The reverse osmosis apparatus may further include first treated water tubes connected to first ends of the first vessels and connected to an outside of the barrel by passing through the first water tank, and second treated water tubes connected to second ends of the second vessels and connected to the outside of the barrel by passing through the second water tank.

Each of the first and second vessels may be configured in a cassette type in which the plurality of reverse osmosis membrane units may be arranged in parallel to be spaced apart from each other.

Each of the first and second vessels may be configured such that 3 to 10 cassette modules having a regular hexagonal, square, or regular triangular cross-section may be connected to each other in series.

Each of the first and second vessels may be configured in a tube sheet type in which a sheet shaped reverse osmosis membrane unit may be wrapped around a tube having a plurality of through holes.

Each of the reverse osmosis membrane units may include a cylindrical casing portion having a reverse osmosis membrane therein, and a head portion coupled to one end of the casing portion and having an outlet hole in a center portion and inlet holes around the center portion.

The head portion may include a cylindrical main body in which the outlet hole and the inlet holes are provided, a first connection tube connected to a first side of the outlet hole, a second connection tube connected to a second side of the outlet hole, and a reduced diameter portion connected from a rim of the main body to the second connection tube while being reduced in diameter thereof.

The head portion may further include a head seal mounted to an outer circumferential surface of the main body to seal a gap between the outer circumferential surface of the main body and an inner circumferential surface of the casing portion, and a retaining ring mounted to the outer circumferential surface of the main body to fix the head portion to the inner circumferential surface of the casing portion.

One of the reverse osmosis membrane units and another reverse osmosis membrane unit may be connected to each other in series by an adapter that may be inserted into outlet holes of both the reverse osmosis membrane units to connect central flow paths thereof to each other.

The adapter may include a first insertion tube inserted into the outlet hole of the one reverse osmosis membrane unit, a second insertion tube inserted into the outlet hole of the another reverse osmosis membrane unit, a connection tube connecting the first insertion tube and the second insertion tube to each other and configured as an integral body having an outer diameter larger than outer diameters of the first and second insertion tubes, and a plurality of seals respectively mounted to outer circumferential surfaces of the first insertion tube and the second insertion tube.

According to an aspect of another exemplary embodiment, there is provided a seawater desalination system including: a pretreatment apparatus configured to intake seawater and filter impurities in the introduced water; a cartridge filter configured to re-filter the water pre-filtered by the pretreatment apparatus; and a reverse osmosis apparatus configured to receive the water filtered by the cartridge filter from a high pressure pump to generate fresh water by reverse osmosis, wherein the reverse osmosis apparatus may include: a barrel in which a plurality of vessels receiving reverse osmosis membrane units may be arranged; a feed tank provided at an intermediate portion of the barrel and connected to a seawater inlet; a first water tank provided inside a first end portion of the barrel and connected to a plurality of first vessels connected to a first side of the feed tank; and a second water tank provided inside a second end portion of the barrel and connected to a plurality of second vessels connected to a second side of the feed tank.

The reverse osmosis apparatus may further include first treated water tubes connected to first ends of the first vessels and connected to an outside of the barrel by passing through the first water tank, and second treated water tubes connected to second ends of the second vessels and connected to the outside of the barrel by passing through the second water tank.

Each of the first and second vessels may be configured in a cassette type in which the plurality of reverse osmosis membrane units are arranged in parallel to be spaced apart from each other.

Each of the first and second vessels may be configured such that 3 to 10 cassette modules having a regular hexagonal, square, or regular triangular cross-section may be connected to each other in series.

The plurality of reverse osmosis membrane units may be configured in a tube sheet type in which a sheet shaped reverse osmosis membrane unit may be wrapped around a product water tube having a plurality of through holes.

Each of the reverse osmosis membrane units may include a cylindrical casing portion having a reverse osmosis membrane therein, and a head portion coupled to one end of the casing portion and having an outlet hole in a center portion and inlet holes around the center portion.

The head portion may include a cylindrical main body in which the outlet hole and the inlet holes may be provided, a first connection tube connected to a first side of the outlet hole, a second connection tube connected to a second side of the outlet hole, and a reduced diameter portion connected from a rim of the main body to the second connection tube while being reduced in diameter thereof.

The head portion may further include a head seal mounted to an outer circumferential surface of the main body to seal a gap between the outer circumferential surface of the main body and an inner circumferential surface of the casing portion, and a retaining ring mounted to the outer circumferential surface of the main body to fix the head portion to the inner circumferential surface of the casing portion.

One of the reverse osmosis membrane units and another reverse osmosis membrane unit may be connected to each other in series by an adapter that may be inserted into outlet holes of both the reverse osmosis membrane units to connect central flow paths thereof to each other.

The adapter may include a first insertion tube inserted into the outlet hole of the one reverse osmosis membrane unit, a second insertion tube inserted into the outlet hole of the another reverse osmosis membrane unit, a connection tube connecting the first insertion tube and the second insertion tube to each other and configured as an integral body having an outer diameter larger than outer diameters of the first and second insertion tubes; and a plurality of seals respectively mounted to outer circumferential surfaces of the first insertion tube and the second insertion tube.

According to the reverse osmosis apparatus and the seawater desalination system having the same of one or more exemplary embodiments, the reverse osmosis apparatus is configured such that seawater is fed to the feed tank arranged in the intermediate portion of the barrel at high pressure, the plurality of vessels are arranged in both sides of the feed tank, and the water tanks are arranged in both sides of the barrel. Therefore, in the design of a high capacity reverse osmosis apparatus, a compact design may be realized, and energy consumption may be reduced. Further, the life of the reverse osmosis membrane is extended and the replacement of the reverse osmosis membrane units or the vessels is easy, thereby reducing maintenance costs.

BRIEF DESCRIPTION OF THE DRAWINGS

The above and other aspects will be more clearly understood from the following description of the exemplary embodiments with the accompanying drawings, in which.

DETAILED DESCRIPTION

Figure 1:
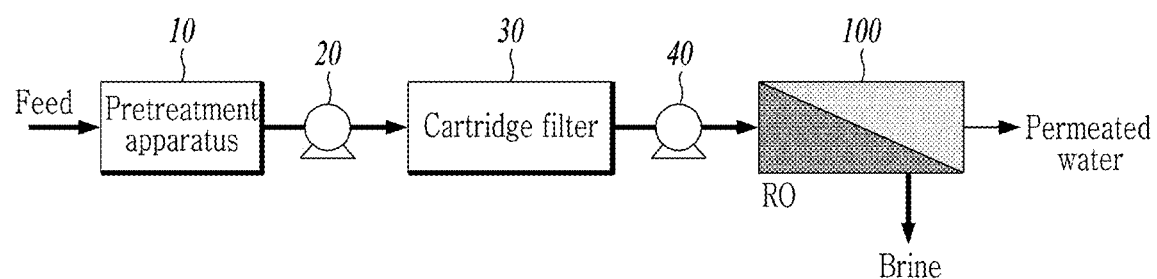
FIG. 1 is a view schematically showing a seawater desalination system according to an exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific, but they should be construed to include all modifications, equivalents, and alternatives of the embodiments included within the spirit and scope disclosed herein When terms such as "on" and "over" are used herein to refer to layers, areas, patterns, or structures, it should be understood that a layer, area, pattern, or structure may be located above another layer, area, pattern, or structure directly or indirectly via an intervening layer, area, pattern, or structure. When terms such as "under" and "below" are used herein to refer to layers, areas, patterns, or structures, it should be understood that a layer, area, pattern, or structure may be located below another layer, area, pattern, or structure directly or indirectly via an intervening layer, area, pattern, or structure.

The terminology used herein is for the purpose of describing specific embodiments only and is not intended to limit the scope of the disclosure. As used herein, the singular forms are intended to include the plural forms as well, unless the context clearly indicates otherwise. The terms such as "comprise," "include", "including", "have/has", and/or "having" should be construed as designating that there are such features, integers, steps, operations, elements, components, and/or combinations thereof, but not to preclude the presence or possibility of adding of one or more other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinbelow, exemplary embodiments will be described in detail with reference to the accompanying drawings. The same reference numerals will be used throughout the drawings and the description to refer to the same or like elements or parts. In certain embodiments, a detailed description of functions and configurations well known in the art may be omitted to avoid obscuring appreciation of the disclosure by a person of ordinary skill in the art. For the same reason, some elements may be exaggerated, omitted, or schematically illustrated in the accompanying drawings.

FIG. 1 is a view schematically showing a seawater desalination system according to an exemplary embodiment.

Referring to FIG. 1, the seawater desalination system may include a pretreatment apparatus 10, a cartridge filter 30, and a reverse osmosis apparatus 100.

The pretreatment apparatus 10 is configured to intake seawater and filter impurities in the introduced water. An intake device provided to intake seawater may be arranged in front of the pretreatment apparatus 10.

Pretreatment process of the pretreatment apparatus 10 includes a precipitation treatment, a filtration treatment, and a chemical treatment. The precipitation treatment and the filtration treatment are performed to prevent contamination of membranes by removing suspended solid in raw water. The chemical treatment is performed to control water quality of feed water so as to maintain performance of a reverse osmosis membrane. Furthermore, high performance pretreatment is necessary to prevent contamination of the reverse osmosis membrane.

The cartridge filter 30 is configured to re-filter the pretreat-filtered water to remove fine impurities from the water. A feed pump 20 may be arranged in front of the cartridge filter 30 in order to feed the pretreated water to the cartridge filter 30 at a predetermined pressure.

The reverse osmosis apparatus 100 is configured to receive the water filtered through the cartridge filter 30 by a high pressure pump 40 to generate fresh water by reverse osmosis (RO). RO is a phenomenon in which pure solvent escapes from a solution through a semipermeable membrane when a pressure higher than osmotic pressure is applied. Seawater may be desalinated using RO. In order to cause RO, the high pressure pump 40 for supplying filtered water at a pressure higher than the osmotic pressure of seawater is arranged in front of the reverse osmosis apparatus 100.

When the feed seawater passes through the reverse osmosis apparatus 100, the seawater is converted to high salinity water, and the water passing through the reverse osmosis membrane is converted to permeated water. A post-treatment apparatus may be arranged in rear of the reverse osmosis apparatus 100 to re-treat the filtered permeated water. The post-treatment apparatus may perform pH adjustment, mineral injection, and chlorination.

Figure 2:
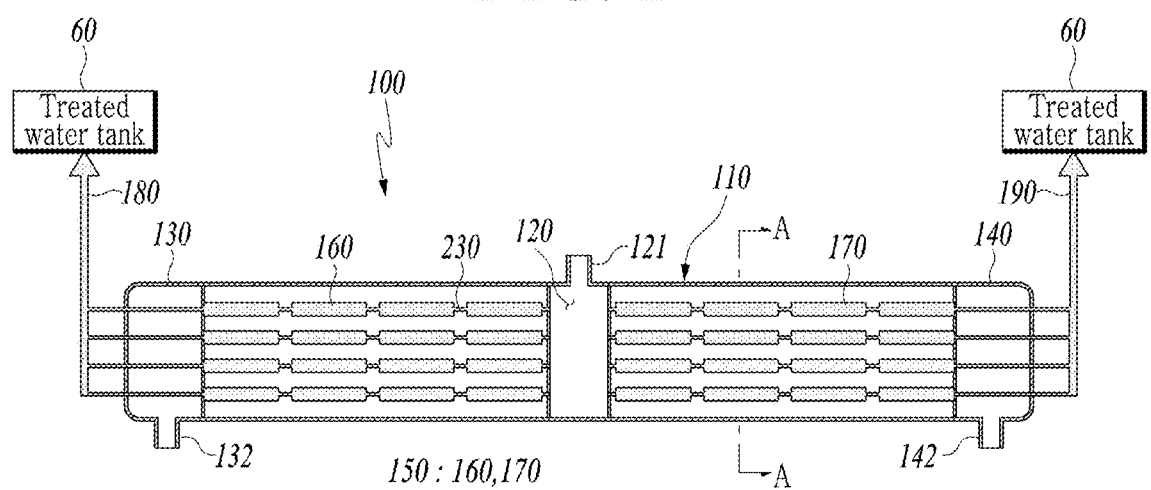
FIG. 2 is a view schematically showing a reverse osmosis apparatus according to the exemplary embodiment.
Figure 3A:
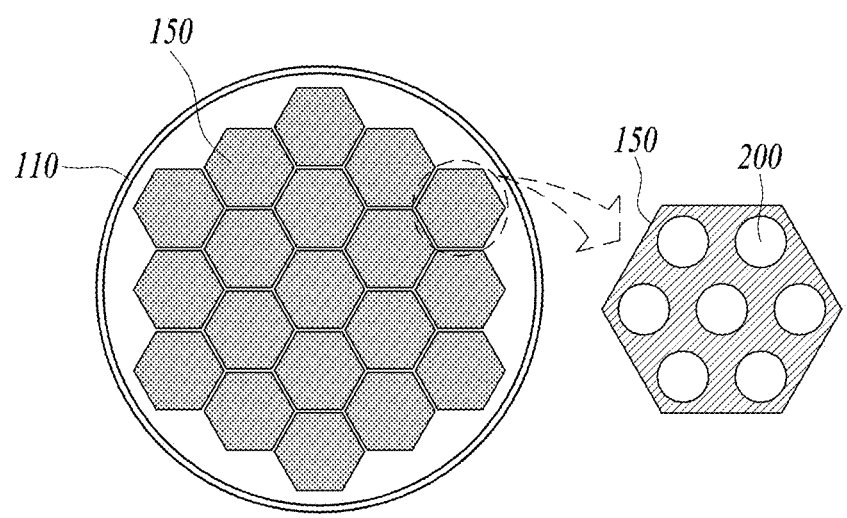
FIG. 3A is a cross-sectional view taken along line A-A in FIG. 2.
Figure 3B:
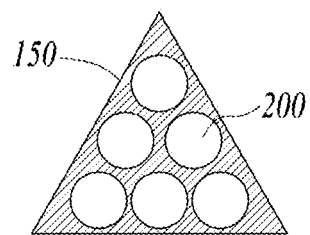
FIG. 3B is a cross-sectional view showing another form of a cassette module.
Figure 4A:
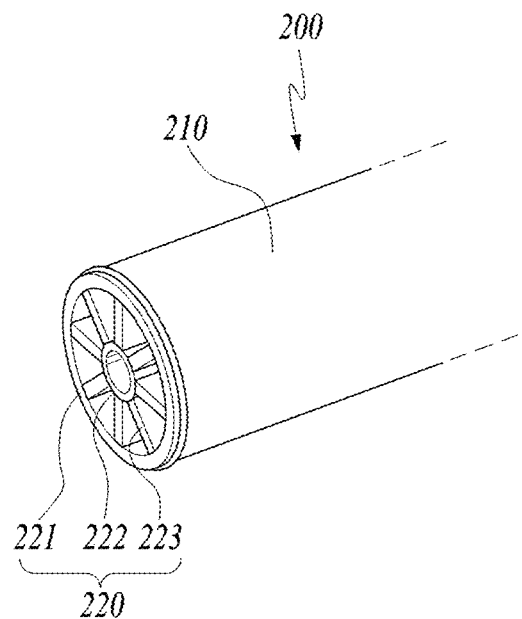
FIG. 4A is a partial perspective view showing a reverse osmosis membrane unit according to the exemplary embodiment.
Figure 4B:
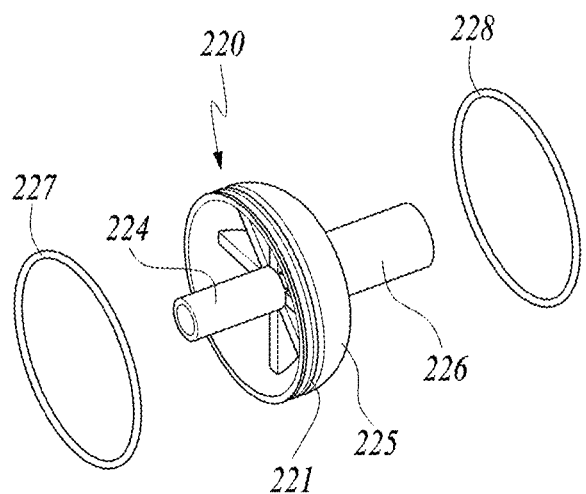
FIG. 4B is a disassembled perspective view showing a head portion.
Figure 5A:
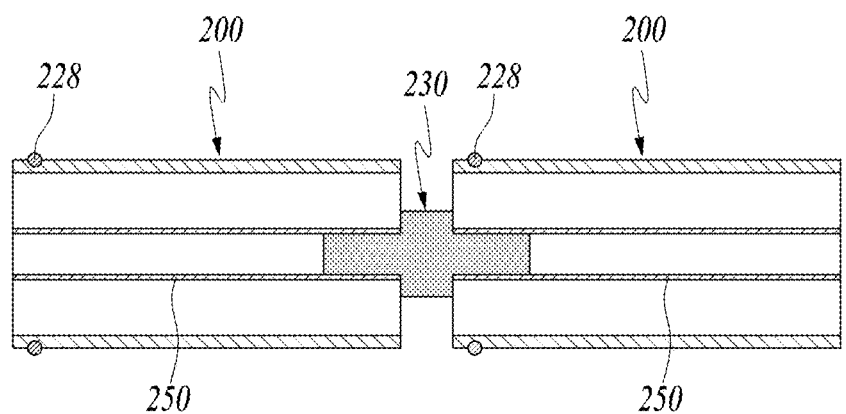
FIG. 5A is a view schematically showing two reverse osmosis membrane units connected to each other by an adapter.
Figure 5B:
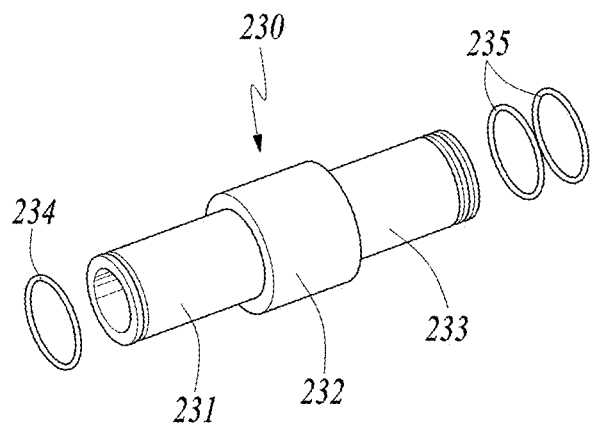
FIG. 5B is a disassembled perspective view showing the adapter.

FIG. 2 is a view schematically showing the reverse osmosis apparatus 100 according to the exemplary embodiment. FIG. 3A is a cross-sectional view taken along line A-A in FIG. 2, and FIG. 3B is a cross-sectional view showing another form of a cassette module. FIG. 4A is a partial perspective view showing a reverse osmosis membrane unit according to the exemplary embodiment, and FIG. 4B is a disassembled perspective view showing a head portion. FIG. 5A is a view schematically showing two reverse osmosis membrane units connected to each other by an adapter, and FIG. 5B is a disassembled perspective view showing the adapter.

Referring to FIG. 2, the reverse osmosis apparatus 100 for the seawater desalination system includes a barrel 110 in which a plurality of vessels 150 receiving reverse osmosis membrane units 200 are arranged, a feed tank 120 provided in an intermediate portion of the barrel 110 and connected to a seawater inlet 121, a first water tank 130 provided inside a first end portion of the barrel 110 and connected to a plurality of first vessels 160 connected to a first side of the feed tank 120, and a second water tank 140 provided inside a second end portion of the barrel 110 and connected to a plurality of second vessels 170 connected to a second side of the feed tank 120.

The barrel 110 may be provided such that a cylinder with a diameter of several meters is arranged horizontally in a longitudinal direction thereof.

Inside the barrel 110, the plurality of vessels 150 may be arranged in rows and columns. For example, a plurality of set in which several vessels 150 are connected together in series may be arranged in the cylindrical barrel 110 in parallel. As shown in FIG. 3A, in each of the vessels 150, a plurality of reverse osmosis membrane units 200 may be arranged to be spaced apart from each other.

The feed tank 120 including the plurality of first vessels 160 connected to the first side thereof and the plurality of second vessels 170 connected to the second side thereof is provided in the intermediate portion of the barrel 110. The seawater inlet 121 is connected to the feed tank 120 and may be connected to an upper surface of the cylindrical barrel 110. High-pressure seawater may be introduced into the feed tank 120 through the seawater inlet 121 by the high pressure pump 40 and supplied to both the plurality of first vessels 160 and the plurality of second vessels 170.

As shown in FIG. 2, the first water tank 130 may be provided inside the left end of the barrel 110, and the second water tank 140 may be provided inside the right end of the barrel 110. The first water tank 130 may be connected to the left side of the feed tank 120 through the plurality of first vessels 160 and the second water tank 140 may be connected to the right side of the feed tank 120 through the plurality of second vessels 170.

A high salinity water outlet 132 is connected to the first water tank 130 to discharge water having increased salinity because the water does not pass through the reverse osmosis membranes of the plurality of first vessels 160. Further, a high salinity water outlet 142 is connected to the second water tank 140 to discharge water having increased salinity because the water does not pass through the reverse osmosis membranes of the plurality of second vessels 170. Connection tubes pass through the inside of the first water tank 130 from low salinity water tubes of the plurality of first vessels 160, and connection tubes may pass through the inside of the second water tank 140 from low salinity water tubes of the plurality of second vessels 170. Water passing through the reverse osmosis membranes in the plurality of first vessels 160 may be fed to a treated water tank 60 through first treated water tubes 180, and water passing through the reverse osmosis membranes in the plurality of second vessels 170 may be fed to the treated water tank 60 through second treated water tubes 190.

The first water tank 130 and the second water tank 140 may be removably coupled to the both ends of the barrel 110, respectively. On the other hand, the first water tank 130 and the second water tank 140 may be formed in an integral body to the barrel 110 to have a sealable door to allow a person to enter. A manager may easily perform maintenance such as replacement of the plurality of first vessels 160, the plurality of second vessels 170, and the reverse osmosis membrane units 200 by entering the removable and openable first water tank 130 or the second water tank 140.

Referring to FIG. 3A, each of the vessels 150 may be formed in a cassette type in which the reverse osmosis membrane units 200 are arranged in parallel to be spaced apart from each other. The first vessels 160 and the second vessels 170 may be arranged in a cassette module, and the plurality of reverse osmosis membrane units 200 are arranged to be spaced apart from each other in the cassette having a cross-section of at least one of a regular hexagon, a square, and a regular triangle. Furthermore, the plurality of vessels 150 may be configured such that 3 to 10 cassette modules are connected to each other in series. In FIG. 2, one set of the vessels 150 is illustrated as a configuration including four cassette modules connected in series.

As shown in FIG. 3A, the plurality of vessels 150 may be formed to have a regular hexagonal cross-sectional shape. When each of the vessels 150 has the regular hexagonal cross-sectional shape, a cassette module may be in close contact with other adjacent cassette modules during layering cassette modules, so that efficient use of space may be realized.

Inside each of vessels 150, the plurality of reverse osmosis membrane units 200 may be arranged to be spaced apart from each other. In the enlarged view of FIG. 3A, a total of 7 reverse osmosis membrane units 200 are arranged in one cassette module 150 in a way in which 2-3-2 units are arranged based on each row, but the number of the reverse osmosis membrane units 200 may be provided variously.

Referring to FIG. 3B, the plurality of vessels 150 may be formed to have a regular triangular cross section. In this case, triangles of the cassette modules are layered to intersect each other in a zigzag, so that adjacent cassette modules may be arranged to be in close contact with each other.

Referring to FIG. 4A, each of the reverse osmosis membrane units 200 may include a cylindrical casing portion 210 having a reverse osmosis membrane therein and a head portion 220 coupled to one end of the casing portion 210 and having an outlet hole at a center portion thereof and inlet holes around the center portion.

The head portion 220 may include a circular rim-shaped main body 221 inserted into the one end of the casing portion 210, a hub 222 enclosing the outlet hole at the center portion thereof, and a plurality of blades 223 integrally connected between an outer circumferential surface of the hub 222 and an inner circumferential surface of the main body 221. The plurality of blades 223 may provide a plurality of inlet holes between the blades.

Inside the cylindrical casing portion 210, the reverse osmosis membrane may be arranged in a form surrounding a center portion corresponding to the outlet hole of the head portion 220 or a plurality of reverse osmosis membranes may be arranged to be layered. Accordingly, water may be collected into the center portion of the casing portion 210 by passing through the reverse osmosis membrane from the seawater introduced to the outside of the reverse osmosis membrane.

Referring to FIG. 4B, the head portion 220 may include the cylindrical main body 221 having the outlet hole and the inlet holes therein, a first connection tube 224 connected to a first side of the outlet hole, a second connection tube 226 connected to a second side of the outlet hole, and a reduced diameter portion 225 connected from a rim of the main body 221 to the second connection tube 226 with a decrease in a diameter of the head portion.

The head portion 220 in FIG. 4B may be configured such that the first connection tube 224 and the second connection tube 226 may be integrally connected to both sides of the hub 222 having the central outlet hole. When the head portion 220 has the first connection tube 224 and the second connection tube 226, the treated water tubes 180 and 190 may be easily connected to the first connection tube 224, and the reverse osmosis membrane may be easily mounted by being arranged around the second connection tube 226. A plurality holes may be formed on the reduced diameter portion 225 to allow a fluid to pass through the holes.

The head portion 220 may further include a head seal 228 mounted to an outer circumferential surface of the main body 221 to seal a gap between the outer circumferential surface of the main body 221 and an inner circumferential surface of the casing portion 210 and a retaining ring 227 mounted to the outer circumferential surface of the main body 221 to fix the head portion 220 to an inner circumferential surface of the casing portion 210.

The outer circumferential surface of the main body 221 may have grooves to which the head seal 228 and the retaining ring 227 are mounted.

The head seal 228 may be made of a rubber material such as ethylene propylene diene monomer (EPDM), and the retaining ring 227 may be made of a stainless steel material.

Meanwhile, in the exemplary embodiments, the plurality of cassette modules 150 may be connected to each other in series and the plurality of reverse osmosis membrane units 200 provided in the cassette modules 150 may be connected to each other in series. In FIG. 1, three cassette modules 150 are connected to each other in series, and the series-connected cassette modules are simultaneously connected to each other in parallel.

Referring to FIG. 5A, one reverse osmosis membrane unit 200 and another reverse osmosis membrane unit 200 may be connected to each other in series by an adapter 230 connecting central flow paths of both the reverse osmosis membrane units while being inserted into outlet holes thereof.

As shown in FIG. 5A, the head seal 228 is provided on an outer circumferential surface of one end of each of the reverse osmosis membrane units 200, and the adapter 230 is inserted between center portion of both the reverse osmosis membrane units 200, thereby being coupled thereto. The adapter 230 may be coupled to high salinity water tubes 250 provided at the center portions of the reverse osmosis membrane units 200 while both ends of the adapter 230 are inserted into the high salinity water tubes 250. Each of the high salinity water tubes 250 is configured such that a plurality of through holes are formed on a circumferential surface thereof, so that produced water may be collected by low salinity water passing through the reverse osmosis membrane around the high salinity water tube 250 and flowing into the inside of the high salinity water tube 250.

Referring to FIG. 5B, the adapter 230 may include a first insertion tube 231 inserted into the outlet hole of the first-side reverse osmosis membrane unit 200, a second insertion tube 233 inserted into the outlet hole of the second-side reverse osmosis membrane unit 200, and a connection tube 232 connecting the first insertion tube 231 and the second insertion tube 233 into an integrated body and having an outer diameter larger than those of the first and second insertion tubes 231 and 233.

The first insertion tube 231 may be formed to have an outer diameter larger than that of the second insertion tube 233, and the first insertion tube 231, the connection tube 232, and the second insertion tube 233 may have flow paths therein to allow the water passing through the reverse osmosis membrane to be moved.

An adapter seal 234 may be mounted to an outer circumferential surface of an end of the first insertion tube 231, and two drinking water seals 235 may be mounted to an outer circumferential surface of an end of the second insertion tube 233. The adapter seal 234 may be made of a rubber material such as EPDM similar to the drinking water seals 235. The adapter seal 234 and the drinking water seals 235 may seal a connection portion between the two reverse osmosis membrane units 200 to prevent leakage of the production water.

Figure 6:
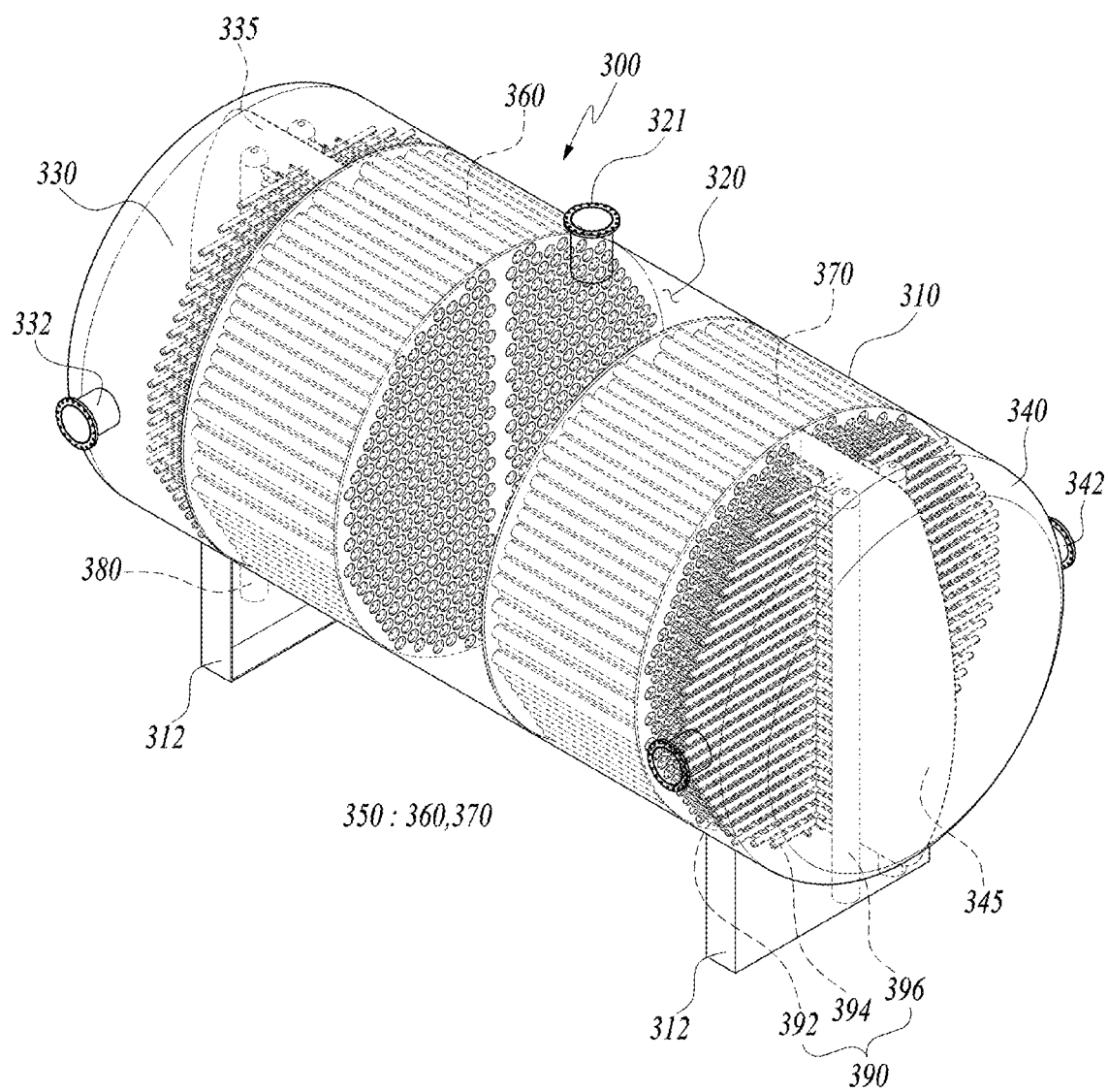
FIG. 6 is a partial perspective projection view showing a reverse osmosis apparatus having a tube sheet type vessel structure according to another exemplary embodiment.

FIG. 6 is a partial perspective projection view showing a reverse osmosis apparatus having a tube sheet type vessel structure according to another exemplary embodiment.

Figure 7:
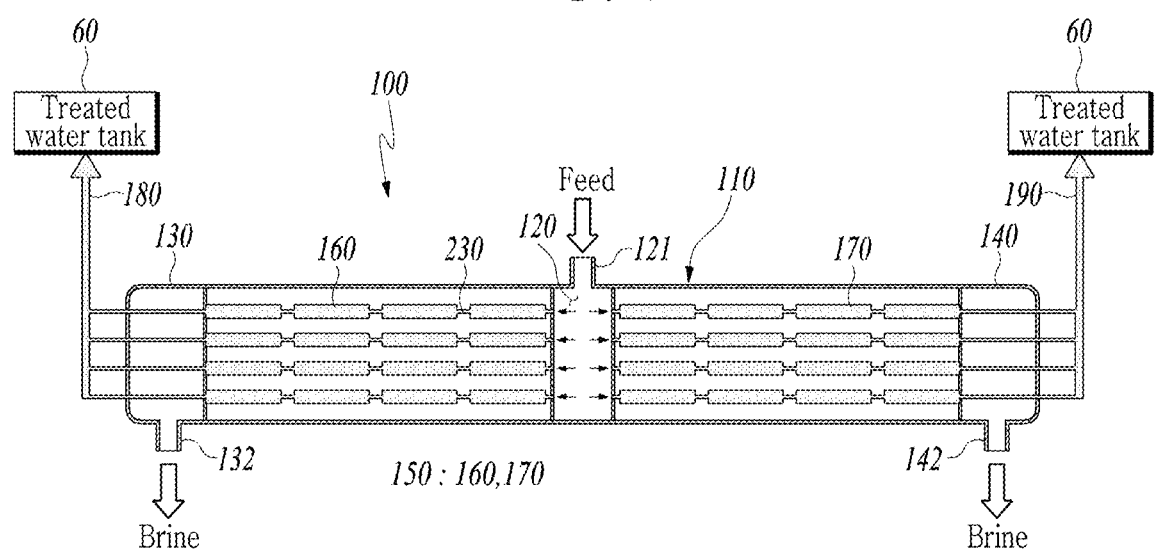
FIG. 7 is a view schematically showing a flow of water in the reverse osmosis apparatus in FIG. 2.

Referring to FIG. 7, a reverse osmosis apparatus 300 having a vessel structure of a tube sheet type includes a feed tank 320 provided in an intermediate portion of a cylindrical barrel 310, a plurality of first vessels 360 and a plurality of second vessels 370 provided in both sides of the feed tank 320 and having reverse osmosis membrane units with a tube sheet type, and a first water tank 330 and a second water tank 340 provided in both ends of the barrel 310 and connected to the plurality of first vessels 360 and the plurality of second vessels 370, respectively.

The cylindrical barrel 310 may be provided to be supported on the ground by a pair of supports 312 coupled to a lower portion of the barrel 310 by welding or fastening. Alternatively, the barrel 310 may be mounted in a frame entirely surrounding the barrel 310.

A seawater inlet 321 may be connected to an upper surface of the feed tank 320 to supply pretreated seawater at high pressure.

The plurality of first vessels 360 and the plurality of second vessels 370 constitute a plurality of vessels 350. The plurality of first vessels 360 and the plurality of second vessels 370 may be configured such that a plurality of sets consisting of a plurality of tube sheet type reverse osmosis membrane units (for example, 3 to 10) are arranged in parallel to be spaced apart from each other. Here, the plurality of tube sheet type reverse osmosis membrane units having sheet shaped reverse osmosis membranes surrounding low salinity water tubes may be connected in series.

The permeated water generated by the first vessels 360 may be transported to the treated water tank 60 through first treated water tubes 380, and the permeated water generated by the plurality of second vessels 370 may be transported to the treated water tank 60 through second treated water tubes 390.

A plurality of vessel connection tubes 392 are respectively connected to a left end of the plurality of first vessels 360 and a right end of the plurality of second vessels 370. The plurality of vessel connection tubes 392 are configured such that connection tubes arranged at the same level are connected to an intermediate connection tube 394, and a plurality of intermediate connection tubes 394 are connected to a collecting tube 396 arranged vertically. Accordingly, the permeated water may be transported to the treated water tank 60 through the second treated water tubes 390. Likewise, the first treated water tubes 380 may include vessel connection tubes, intermediate connection tubes, and a collecting tube, and may be formed symmetrically to the second treated water tubes 390.

The collecting tube of the first treated water tubes 380 and the collecting tube 396 of the second treated water tubes 390 may be respectively configured so that permeated water may be discharged downward through the inside of the first water tank 330 and the inside of the second water tank 340.

A vertical partition wall 335 partitions an inner space of the first water tank 330 into two spaces, and the collecting tube of the first treated water tubes 380 may be provided for each space, so a total of two collecting tubes may be provided. A vertical partition wall 345 partitions an inner space of the second water tank 340 into two spaces, and the collecting tube 396 of the second treated water tubes 390 may be provided for each space, so a total of two collecting tubes may be provided. In this case, two high salinity water outlets 332 may be connected to both sides of the first water tank 330, and two high salinity water outlets 342 may be connected to both sides of the second water tank 340.

FIG. 7 is a view schematically showing a flow of water in the reverse osmosis apparatus in FIG. 2. According to the reverse osmosis apparatus 100, the seawater desalination process will be described with reference to FIG. 7.

The pretreatment apparatus 10 pretreats seawater introduced from the intake device, and the high pressure pump 40 feeds the seawater to the seawater inlet 121 at high pressure. The seawater introduced into the feed tank 120 may be moved to the outside of the reverse osmosis membrane units 200 of the plurality of first vessels 160 and the plurality of second vessels 170, and water is separated from the seawater by RO while passing through the reverse osmosis membranes and may be collected to center portions of the reverse osmosis membrane units 200 and then may be transported to the treated water tank 60 through the first treated water tubes 180 and the second treated water tubes 190. The seawater is introduced into the plurality of first vessels 160 and the plurality of second vessels 170 and the water is separated from the seawater by RO, so that seawater with increased salinity is moved into the first water tank 130 and the second water tank 140. The high salinity water introduced into the first water tank 130 and the second water tank 140 may be discharged through the high salinity water outlets 132 and 142. The high salinity water with increased salinity, that is, concentrated water, may be discharged as sewage by additional waste water treatment.

A part of the permeated water is transported to a brackish water reverse osmosis (BWRO) and passes through the reverse osmosis membranes again, thereby further reducing salinity of the permeated water. BWRO means brackish water reverse osmosis, and brackish water refers to water having a salinity between seawater and fresh water. A part of the permeated water generated in the plurality of first vessels 160 and the plurality of second vessels 170 by RO is introduced to the BWRO by the high pressure pump, thereby further reducing salinity of the permeated water.

While one or more exemplary embodiments have been described with reference to the accompanying drawings, it is to be understood by those skilled in the art that various modifications and changes in form and details may be made therein, without departing from the scope and spirit as disclosed in the accompanying claims. Accordingly, the description of the exemplary embodiments should be construed in a descriptive sense only and not to limit the scope of the claims, and many alternatives, modifications, and variations will be apparent to those skilled in the art.

What is claimed is:

1. A reverse osmosis apparatus for a seawater desalination system, the reverse osmosis apparatus comprising:
   a barrel in which a plurality of first vessels is arranged in one side of the barrel and a plurality of second vessels is arranged in the other side of the barrel, the plurality of first vessels and the plurality of second vessels being receiving reverse osmosis membrane units each of the plurality of first and second vessels being configured in a cassette type containing a plurality of reverse osmosis membrane units arranged therein in parallel to be spaced apart from each other;
   a feed tank provided in a middle of the barrel between the plurality of first vessels and the plurality of second vessels and connected to a seawater inlet;
   a first water tank provided inside a first end portion of the barrel and connected to a plurality of first vessels connected to a first side of the feed tank; and
   a second water tank provided inside a second end portion of the barrel and connected to a plurality of second vessels connected to a second side of the feed tank.

2. The reverse osmosis apparatus of claim 1, further comprising:
   first treated water tubes connected to first ends of the first vessels and connected to an outside of the barrel by passing through the first water tank; and
   second treated water tubes connected to second ends of the second vessels and connected to the outside of the barrel by passing through the second water tank.

3. The reverse osmosis apparatus of claim 2, wherein each of the first and second vessels is configured such that 3 to 10 cassette modules having a regular hexagonal, square, or regular triangular cross-section are connected to each other in series.

4. The reverse osmosis apparatus of claim 2, wherein each of the first and second vessels is configured in a tube sheet type in which a sheet shaped reverse osmosis membrane unit is wrapped around a tube having a plurality of through holes.

5. The reverse osmosis apparatus of claim 1, wherein each of the reverse osmosis membrane units comprises:
   a cylindrical casing portion having a reverse osmosis membrane therein; and
   a head portion coupled to one end of the casing portion and having an outlet hole in a center portion and inlet holes around the center portion.

6. The reverse osmosis apparatus of claim 5, wherein the head portion comprises:
   a cylindrical main body in which the outlet hole and the inlet holes are provided;
   a first connection tube connected to a first side of the outlet hole;
   a second connection tube connected to a second side of the outlet hole; and
   a reduced diameter portion connected from a rim of the main body to the second connection tube while being reduced in diameter thereof.

7. The reverse osmosis apparatus of claim 6, wherein the head portion further comprises:
   a head seal mounted to an outer circumferential surface of the main body to seal a gap between the outer circumferential surface of the main body and an inner circumferential surface of the casing portion; and
   a retaining ring mounted to the outer circumferential surface of the main body to fix the head portion to the inner circumferential surface of the casing portion.

8. The reverse osmosis apparatus of claim 5, wherein one of the reverse osmosis membrane units and another one of reverse osmosis membrane units are connected to each other in series by an adapter that is inserted into outlet holes of both the reverse osmosis membrane units to connect central flow paths thereof to each other.

9. The reverse osmosis apparatus of claim 8, wherein the adapter comprises:
   a first insertion tube inserted into the outlet hole of the one reverse osmosis membrane unit;
   a second insertion tube inserted into the outlet hole of the another reverse osmosis membrane unit;
   a connection tube connecting the first insertion tube and the second insertion tube to each other and configured as an integral body having an outer diameter larger than outer diameters of the first and second insertion tubes; and
   a plurality of seals respectively mounted to outer circumferential surfaces of the first insertion tube and the second insertion tube.

10. A seawater desalination system comprising:
    a pretreatment apparatus configured to intake seawater and filter impurities in introduced water;
    a cartridge filter configured to re-filter the water pre-filtered by the pretreatment apparatus; and
    a reverse osmosis apparatus configured to receive the water filtered by the cartridge filter from a high pressure pump to generate fresh water by reverse osmosis,
    wherein the reverse osmosis apparatus comprises:
    a barrel in which a plurality of first vessels is arranged in one side of the barrel and a plurality of second vessels is arranged in the other side of the barrel, the plurality of first vessels and the plurality of second vessels being receiving reverse osmosis membrane units each of the plurality of first and second vessels being configured in a cassette type containing a plurality of reverse osmosis membrane units arranged therein in parallel to be spaced apart from each other;
    a feed tank provided in a middle of the barrel between the plurality of first vessels and the plurality of second vessels and connected to a seawater inlet;
    a first water tank provided inside a first end portion of the barrel and connected to a plurality of first vessels connected to a first side of the feed tank; and
    a second water tank provided inside a second end portion of the barrel and connected to a plurality of second vessels connected to a second side of the feed tank.

11. The seawater desalination system of claim 10, wherein the reverse osmosis apparatus further comprises:
- first treated water tubes connected to first ends of the first vessels and connected to an outside of the barrel by passing through the first water tank; and
- second treated water tubes connected to second ends of the second vessels and connected to the outside of the barrel by passing through the second water tank.

12. The seawater desalination system of claim 11, wherein each of the first and second vessels is configured such that 3 to 10 cassette modules having a regular hexagonal, square, or regular triangular cross-section are connected to each other in series.

13. The seawater desalination system of claim 11, wherein the plurality of reverse osmosis membrane units is configured in a tube sheet type in which a sheet shaped reverse osmosis membrane unit is wrapped around a product water tube having a plurality of through holes.

14. The seawater desalination system of claim 10, wherein each of the reverse osmosis membrane units comprises:
- a cylindrical casing portion having a reverse osmosis membrane therein; and
- a head portion coupled to one end of the casing portion and having an outlet hole in a center portion and inlet holes around the center portion.

15. The seawater desalination system of claim 14, wherein the head portion comprises:
- a cylindrical main body in which the outlet hole and the inlet holes are provided;
- a first connection tube connected to a first side of the outlet hole;
- a second connection tube connected to a second side of the outlet hole; and
- a reduced diameter portion connected from a rim of the main body to the second connection tube while being reduced in diameter thereof.

16. The seawater desalination system of claim 15, wherein the head portion further comprises:
- a head seal mounted to an outer circumferential surface of the main body to seal a gap between the outer circumferential surface of the main body and an inner circumferential surface of the casing portion; and
- a retaining ring mounted to the outer circumferential surface of the main body to fix the head portion to the inner circumferential surface of the casing portion.

17. The seawater desalination system of claim 14, wherein one of the reverse osmosis membrane units and another one of reverse osmosis membrane units are connected to each other in series by an adapter that is inserted into outlet holes of both the reverse osmosis membrane units to connect central flow paths thereof to each other.

18. The seawater desalination system of claim 17, wherein the adapter comprises:
- a first insertion tube inserted into the outlet hole of the one reverse osmosis membrane unit;
- a second insertion tube inserted into the outlet hole of the another reverse osmosis membrane unit;
- a connection tube connecting the first insertion tube and the second insertion tube to each other and configured as an integral body having an outer diameter larger than outer diameters of the first and second insertion tubes; and
- a plurality of seals respectively mounted to outer circumferential surfaces of the first insertion tube and the second insertion tube.

\* \* \* \* \*